United States Patent [19]

Nawata et al.

[11] 4,366,179

[45] Dec. 28, 1982

[54] OXYGEN AND CARBON DIOXIDE ABSORBENT AND PROCESS FOR STORING COFFEE BY USING THE SAME

[75] Inventors: Takanari Nawata; Toshio Komatsu; Masayuki Ohtsuka, all of Tokyo, Japan

[73] Assignee: Mitsubishi Gas Chemical Company, Inc., Tokyo, Japan

[21] Appl. No.: 242,562

[22] Filed: Mar. 11, 1981

[30] Foreign Application Priority Data

Mar. 17, 1980 [JP] Japan .................................. 55-33654
Mar. 21, 1980 [JP] Japan .................................. 55-35900

[51] Int. Cl.³ ........................ B65B 55/00; A23F 5/02; B01J 31/26
[52] U.S. Cl. ................................. 426/395; 426/124; 426/419; 423/219; 423/230; 252/189; 252/191; 252/429 R; 252/437; 252/439; 252/440; 252/441; 252/455 Z; 252/457; 252/459; 252/473

[58] Field of Search ................. 252/188–192, 252/428, 429 R, 437, 439, 440, 441, 443, 455 Z, 457, 459, 473, 474; 426/118, 124, 395, 398; 423/219, 230; 55/74, 387

[56] References Cited

U.S. PATENT DOCUMENTS

| | | | |
|---|---|---|---|
| 2,430,663 | 11/1947 | Behlman | 426/124 |
| 3,519,384 | 7/1970 | Engel et al. | 423/230 |
| 4,127,503 | 11/1978 | Yoshikawa et al. | 252/429 R |
| 4,166,807 | 9/1979 | Komatsu et al. | 252/429 R |
| 4,192,773 | 3/1980 | Yoshikawa et al. | 252/429 R |
| 4,230,595 | 10/1980 | Yamaji et al. | 423/219 X |

*Primary Examiner*—Earl C. Thomas
*Attorney, Agent, or Firm*—Fleit & Jacobson

[57] ABSTRACT

An oxygen and carbon dioxide absorbent comprising (A) a particulate substance wherein the particles of a hydrous alkali substance are covered with separator particles, (B) iron powder and (C) an electrolyte and a process for storing coffee by using the same is disclosed.

8 Claims, No Drawings

OXYGEN AND CARBON DIOXIDE ABSORBENT AND PROCESS FOR STORING COFFEE BY USING THE SAME

BACKGROUND OF THE INVENTION

This invention relates to an improved iron-based oxygen and carbon dioxide absorbent and method for storing coffee powder or beans using such absorbent.

Roasted coffee powder or beans are oxidized and become less fresh during storage. An attempt has been made to place them in a package filled with an inert gas, but because of incomplete oxygen elimination, the product is not satisfactorily prevented from deteriorating. In addition, because of the pressure of carbon dioxide generated from the roasted beans, the package bulges greatly until it breaks.

Most foods can be completely and advantageously protected by an iron-based oxygen absorbent from the deleterious effect of oxygen. But in spite of the presence of an oxygen absorbent, roasted coffee powder or beans in a package generate a great amount of carbon dioxide whose pressure increases to such an amount that the package may break. Besides, the roasted coffee powder or beans have a very low water activity. Most oxygen absorbents have low ability to absorb oxygen in a dry atmosphere, and their ability to absorb oxygen is also decreased in the presence of carbon dioxide. It has been therefore difficult to store roasted coffee powder or beans with an oxygen absorbent. Carbon dioxide may be removed from the package of roasted coffee powder or beans with a $CO_2$ absorbent such as alkaline substances, but when the alkali contacts iron powder used as an oxygen absorbent, the rate of $O_2$ absorption by iron powder becomes slow, particularly when it is contacted by a liquid alkali or alkali powder. As already stated, roasted coffee powder or beans generate a large amount of $CO_2$ and have a very low water activity, so they must be stored by an oxygen absorbent whose absorbability is not decreased in a dry atmosphere or in the presence of $CO_2$ and which can prevent breakage of the package by carbon dioxide generated from coffee powder or beans packed in the package.

SUMMARY OF THE INVENTION

We have made various studies to find a composition that uses iron powder as an oxygen absorbent and which is capable of effectively absorbing oxygen and carbon dioxide without reducing the rate of oxygen absorption in the presence of an alkaline substance and water. As a result, we have found that our aim can be attained by mixing iron powder with a particulate substance comprising the particles of a hydrous alkali substance covered with separator particles. Iron powder does not have direct contact with the alkali in the particulate material, since the particles of the hydrous alkali substance are covered with the separator particles. So, a composition made of the combination of the particulate substance, iron powder and an electrolyte exhibits high ability to absorb oxygen and carbon dioxide in the package in which roasted coffee powder or beans are packed hermetically.

Therefore, this invention provides an oxygen and carbon dioxide absorbent comprising (A) a particulate substance wherein the particles of a hydrous alkali substance are covered with separator particles, (B) iron powder, and (C) an electrolyte.

DETAILED DESCRIPTION OF THE INVENTION

By the "equilibrium relative humidity" of a substance in the specification and the claims is meant percent of humidity at 25° C. of a nitrogen-filled enclosure containing the substance per humidity at 25° C. of a nitrogen-filled enclosure containing water.

The particulate substance (A) used in this invention wherein the particles of a hydrous alkali substance is covered with separator particles is preferably adjusted for its relative humidity so that the equilibrium relative humidity of the resulting oxygen absorbent prepared is more than 30% and equal to or less than 100%. In consideration of the transfer of water to coffee powder or beans, an equilibrium relative humidity of less than 80% is preferred. The hydrous alkali substance in (A) is a particulate alkaline earth metal hydroxide impregnated with water or a moisture-conditioning solution, or a particulate carrier of low water solubility which is impregnated with an aqueous alkaline solution. When a particulate alkaline earth metal hydroxide is impregnated with water or a moisture-conditioning solution, the hydroxide is magnesium hydroxide, calcium hydroxide, or barium hydroxide. Calcium hydroxide is preferred. The particle size of the hydroxide is more than 0.5 mm, preferably more than 1 mm. The particulate hydroxide is then impregnated with water or a moisture-conditioning solution. The moisture-conditioning solution is used to improve the water retention of the final composition. By the term "moisture-conditioning solution" is meant a solution that is prepared by dissolving a suitable material in water and which is capable of adjusting the equilibrium relative humidity. Preferably, an aqueous solution having an equilibrium relative humidity of more than 30% is used. An aqueous solution having a hydrophilic inorganic or organic compound dissolved therein is used, and an aqueous solution having an inorganic compound, especially an inorganic salt, is used with advantage. Examples of the inorganic compound are NaCl, NaBr, KI, $CaCl_2$, $MgCl_2$, $BaCl_2$, $Na_2SO_4$, $KNO_3$, $K_3PO_4$, $K_2HPO_4$, $Na_2CO_3$ and $K_2CO_3$, and NaCl, NaBr, $CaCl_2$ and $MgCl_2$ are preferred. Examples of the organic compound are polyhydric alcohols such as glycerin and ethylene glycol, and organic salts such as sodium acetate and magnesium acetate. These aqueous solutions are capable of changing equilibrium relative humidity over a wide range by adjusting their concentration. Any method can be used to impregnate the particulate hydroxide of alkaline earth metal with water or other moisture-conditioning solutions; they may be added in an amount that does not reduce the fluidity of the hydroxide, or alternatively, the particulate hydroxide immersed in water or moisture-conditoning solutions may be freed of the surface liquid by filtration, centrifugation or like technique.

The particulate substance (A) may also be prepared by impregnating a particulate carrier of low water solubility with an aqueous alkaline solution. Examples of the particulate carrier include diatomaceous earth, perlite, zeolite, activated alumina, silica gel, activated carbon, sand, activated clay and any other particulate carrier which has low solubility in water. The particulate carrier here used generally has a particle size of 0.5 to 10 mm. The aqueous alkaline solution is prepared by dissolving an alkaline substance in water. Preferred examples of the alkaline substance are hydroxides, carbonates, tertiary phosphates, silicates and aluminates of alkali metals, more specifically, NaOH, KOH, Na$_2$CO$_3$, K$_2$CO$_3$, Na$_3$PO$_4$, K$_3$PO$_4$, Na$_2$SiO$_3$, K$_2$SiO$_3$, NaAlO$_2$ and KAlO$_2$. Any method can be used to impregnate the particulate carrier of low water solubility with aqueous alkaline solution; the particulate carrier may be mixed with the aqueous alkaline solution to such an extent that its fluidity does not become excessively low, or alternatively, the particulate carrier immersed in the aqueous solution may be freed of the surface liquid by filtration, centrifugation or like technique.

The resulting particles of hydrous alkaline substance is then covered with separator particles to form a component (A). The particles preferably are finer than a size of 100 mesh, and examples are gypsum, plaster of Paris, calcium carbonate, activated carbon, talc, silica, carbon black, zeolite, and bentonite.

Iron powder (B) is used as a component to absorb oxygen in the composition of this invention, and to provide better contact with oxygen, the powder is finer than a size of 10 mesh, preferably less than 50 mesh. Reduced iron powder, electrolytic iron powder and atomized iron powder are advantageous examples of the iron powder. No pure iron powder need be used, and so long as the object of this invention is achieved, iron powder containing various impurities, as well as iron carbide and cast iron may likewise by used.

The third component in the oxygen and carbon dioxide absorbent of this invention is an electrolyte (C). A preferred electrolyte is a strong electrolytic inorganic salt illustrated by metal halides. The metal component in the metal halide is at least one metal selected from the group consisting of alkali metal, alkaline earth metal, copper, zinc, aluminum, tin, manganese, iron, cobalt and nickel, and alkali metal and alkaline earth metals such as lithium, sodium, potassium, magnesium, calcium and barium are preferred. The halogen component in the metal halide is chlorine, bromine or iodine. These electrolytes may be used either alone or in combination. The electrolyte (C) may be mixed with the other components (A) and (B) in various methods: (1) a filler is immersed in an aqueous solution of the electrolyte to impregnate the electrolyte in the filler, and is then mixed with the components (A) and (B) and (2) the electrolyte in a solid form is directly mixed with the other components. Preferably, the electrolyte is first mixed with iron powder (B), then with the particulate substance (A). The electrolyte may be mixed with iron by any method, e.g., simple blending, or mixing of an aqueous solution of electrolyte with iron powder, followed by drying to have the surface of the iron powder covered with the electrolyte. The electrolyte is used in an amount of more than 0.1 part, preferably more than 1 parts, based on 100 parts of the iron powder.

There is no particular limitation on the proportion of the components (A) and (B), and it is determined properly by considering the rate and amount of oxygen absorption, as well as the amount and rate of CO$_2$ generated by roasted coffee powder or beans stored in the presence of the oxygen and carbon dioxide absorbent of this invention.

Oxygen and carbon dioxide absorbents usually achieve their function as they are wrapped in a gas permeable package. Since roasted coffee powder or beans have low water activity and generate carbon dioxide, it is preferred that the package be made of a material having a gas permeability that prevents the escape of water from the content of the package. For this purpose, a package having a gas permeability of 1,000 to 100,000 seconds/100 ml (air) according to JIS P8117 is used with advantage.

The great advantage of the oxygen and carbon dioxide absorbent according to this invention is that its oxygen absorbing rate does not drop in a dry atmosphere or in the presence of CO$_2$. The oxygen and carbon dioxide absorbent according to this invention can be used in storing various substances, and it is particularly suitable for storing roasted coffee powder or beans. The oxygen and carbon dioxide absorbent according to this invention quickly absorbs oxygen in an enclosed bag of roasted coffee powder or beans while absorbing carbon dioxide generated by the beans, so it keeps the beans fresh without letting the bag bulge or break.

This invention is now described in greater detail by reference to the following non-limiting examples.

EXAMPLE 1

A hundred parts of calcium hydroxide particles 0.7 mm in size impregnated with 32 parts of water were mixed with 25 parts of gypsum powder (separator particles) to provide a gypsum coating on the surface of the particles. A mixture of 3 g of the resulting particulate substance, 2 g of iron and 1 g of sodium chloride was packed in a paper bag laminated with a foraminous polyethylene film having a Gurley gas permeability of 30,000 seconds/100 ml (air), and the bag was placed in a KOP/PE (a tradename of Daicel, Ltd., for a laminate of polyvinylidene film and oriented polypropylene film) film bag together with 500 g of roasted coffee beans to provide a hermetic enclosure (Sample 1) which was left to stand at 25° C. Sample 2, a KOP/PE film pack containing only 500 g of roasted coffee beans, and Sample 3, a paper bag containing only 500 g of roasted coffee beans, were also left to stand at 25° C. The time-dependent change in the O$_2$ and CO$_2$ levels in Samples 1 and 2 was checked, and the results are shown in Table 1 below.

TABLE 1

|  | 2 days | | 10 days | | 45 days | |
| --- | --- | --- | --- | --- | --- | --- |
|  | O$_2$ (%) | CO$_2$ (%) | O$_2$ (%) | CO$_2$ (%) | O$_2$ (%) | CO$_2$ (%) |
| Sample 1 | 0.33 | 1.56 | 0.00 | 0.77 | 0.00 | 0.23 |
| Sample 2 | 12.17 | 29.17 | 6.41 | 61.16 | 4.24 | 75.28 |

Due to the pressure of CO$_2$ generated from coffee beans, the bag of Sample 2 bulged outward greatly, and because the heat seals separated from each other in some portions, the bag was about to break.

After a 45-day storage, the coffee beans were recovered from the three major samples, and their peroxide value was determined and an organoleptic test conducted for aroma and taste. The results are shown in Table 2 below.

TABLE 2

|  | fresh beans | 45 days later | | |
| --- | --- | --- | --- | --- |
|  |  | Sample 1 | Sample 2 | Sample 3 |
| peroxide value (meq/kg) | 0 | 0.2 | 6.2 | 8.6 |
| aroma | 5 | 4 | 2 | 2 |
| taste | 5 | 5 | 2 | 2 |

Criterion for organoleptic evaluation (aroma and taste)
5*: very good
4: fairly good
3: good
2: ordinary
1: not good

EXAMPLE 2

A hundred parts of magnesium hydroxide particles (2 mm) was impregnated with 43 parts of a 25% aqueous NaCl solution. A mixture of 5 parts of activated carbon powder and 15 parts of silica powder was adhered to the magnesium hydroxide particles impregnated with NaCl solution. A mixture of 3 g of the resulting particulate material, 2 g of iron powder and 0.5 of the various electrolytes indicated in Table 3 below was packed in a paper bag laminated with a foraminous polyethyllene film having a Gurley gas permeability of 4,000 seconds/100 ml (air), and the bag was placed in a KOP/PE film bag together with 500 g of roasted coffee beans to provide a hermetic enclosure which was left to stand at 25° C. The time-dependent change in the $O_2$ and $CO_2$ levels in the hermetic enclosure was checked, and the results are shown in Table 3 below.

TABLE 3

| electro-lyte | 2 days | | 10 days | | 45 days | |
|---|---|---|---|---|---|---|
| | $O_2$ (%) | $CO_2$ (%) | $O_2$ (%) | $CO_2$ (%) | $O_2$ (%) | $CO_2$ (%) |
| NaBr | 0.05 | 3.52 | 0.00 | 1.81 | 0.00 | 0.28 |
| KI | 0.03 | 3.36 | 0.00 | 1.63 | 0.00 | 0.23 |
| $CaI_2$ | 0.08 | 3.20 | 0.00 | 1.60 | 0.00 | 0.22 |
| $ZnCl_2$ | 0.06 | 3.01 | 0.00 | 1.46 | 0.00 | 0.19 |
| $AlCl_3$ | 0.03 | 3.30 | 0.00 | 1.61 | 0.00 | 0.21 |
| $SnCl_2$ | 0.03 | 3.20 | 0.00 | 1.60 | 0.00 | 0.20 |
| $MnBr_2$ | 0.12 | 3.31 | 0.00 | 1.61 | 0.00 | 0.22 |

EXAMPLE 3

A hundred parts of zeolite particles (1.5 mm$\phi$) impregnated with 30 parts of 40% aqueous sodium hydroxide solution was mixed with 20 parts of bentonite powder to provide a bentonite coating on the surface of the particles. A mixture of 40 g of the resulting particulate substance and NaCl-coated iron powder obtained by blending 100 parts of iron powder and 2 parts of a 20% NaCl solution, followed by drying the blending was put in paper bag laminated with a foraminous polyethylene film having a Gurley gas permeability of 30,000 seconds/100 ml (air), and the bag was placed in a KOP/PE film bag together with 500 g of roasted coffee beans to provide a hermetic enclosure (Sample 4) which was left to stand at 25° C. Sample 5, a KOP/PE film pack containing only 500 g of roasted coffee beans, and Sample 6, a paper bag containing only 500 g of roasted coffee beans, were also left to stand at 25° C. The time-dependent change in the $O_2$ and $CO_2$ levels in Samples 4 and 5 were checked, and the results are shown in Table 4 below.

TABLE 4

| | 2 days | | 10 days | | 45 days | |
|---|---|---|---|---|---|---|
| | $O_2$ (%) | $CO_2$ (%) | $O_2$ (%) | $CO_2$ (%) | $O_2$ (%) | $CO_2$ (%) |
| Sample 4 | 0.43 | 0.52 | 0.00 | 0.45 | 0.00 | 0.12 |
| Sample 5 | 12.17 | 29.17 | 6.41 | 61.16 | 4.24 | 75.28 |

Due to the pressure of $CO_2$ generated from coffee beans, the bag of Sample 5 bulged outward greatly, and because the heat seals separated from each other in some portions, the bag was about to break.

After a 45-day storage, the coffee beans were recovered from the three samples, and their peroxide value was determined and an organoleptic test conducted for aroma and taste. The results are shown in Table 5 below.

TABLE 5

| | fresh beans | 45 days later | | |
|---|---|---|---|---|
| | | Sample 1 | Sample 2 | Sample 3 |
| peroxide value | 0 | 0.2 | 6.2 | 8.6 |
| aroma | 5 | 4 | 2 | 2 |
| taste | 5 | 5 | 2 | 2 |

EXAMPLE 4

A hundred parts of activated alumina particles (4 mm$\phi$) impregnated with 30 parts of 50% potassium carbonate was covered with a coating of a mixture of 3 parts of activated carbon powder and 5 parts of silica powder. A mixture of 60 g of the resulting particulate material, 2 g of iron powder and 0.5 g of the various electrolytes indicated in Table 6 below was packed in a paper bag laminated with a foraminous polyethylene film having a Gurley gas permeability of 4,000 seconds/100 ml (air), and the bag was placed in a KOP/PE film bag together with 500 g of roasted coffee beans to provide a hermetic enclosure which was left to stand at 25° C. The time-dependent change in the $O_2$ and $CO_2$ levels in the hermetic enclosure was checked, and the results are shown in Table 6 below.

TABLE 6

| electro-lyte | 2 days | | 10 days | | 45 days | |
|---|---|---|---|---|---|---|
| | $O_2$ (%) | $CO_2$ (%) | $O_2$ (%) | $CO_2$ (%) | $O_2$ (%) | $CO_2$ (%) |
| NaBr | 0.53 | 0.68 | 0.00 | 0.55 | 0.00 | 0.23 |
| KI | 0.71 | 0.43 | " | 0.38 | " | 0.09 |
| $CaCl_2$ | 0.65 | 0.33 | " | 0.27 | " | 0.12 |
| $ZnCl_2$ | 0.52 | 0.76 | " | 0.48 | " | 0.25 |
| $AlCl_3$ | 0.54 | 0.51 | " | 0.33 | " | 0.17 |
| $SnCl_2$ | 0.48 | 0.43 | " | 0.31 | " | 0.27 |
| $MnBr_2$ | 0.77 | 0.30 | " | 0.26 | " | 0.23 |

What is claimed is:

1. A method for storing roast coffee powder or beans in a hermetically sealed container made of a substantially gas impermeable packing material that also contains an oxygen and carbon dioxide absorbent comprising (a) a particulate calcium hydroxide impregnated with water or a moisture-conditioning solution and then coated with separator particles, (b) iron powder, and (c) an electrolyte.

2. A method according to claim 1 wherein the equilibrium relative humidity of the particulate substance (a) is so adjusted that the relative humidity at 25° C. of a nitrogen-filled enclosure of the oyxgen absorber is more than 30%.

3. A method according to claim 1 wherein the calcium hydroxide has a particle size of more than 0.5 mm.

4. A method according to claim 1 wherein the moisture-conditioning solution is an aqueous solution of a hydrophilic inorganic or organic compound.

5. A method according to claim 1 wherein the separator particles are finer than a size of 100 mesh.

6. A method according to claim 1 wherein the separator particles are selected from the group consisting of gypsum, plaster of Paris, calcium carbonate, activated carbon, talc, silica, carbon black, zeolite and bentonite.

7. A method according to claim 1 wherein the electrolyte is at least one metal halide.

8. A method according to claim 1 wherein the iron powder (b) is covered with a coating of the electrolyte (c).

* * * * *